United States Patent [19]

Nobusawa

[11] 3,827,060
[45] July 30, 1974

[54] AUTOMATIC CAMERA SHUTTER CONTROLS UTILIZING PHOTOELECTRICALLY CONVERTED PULSES

[75] Inventor: Tsukumo Nobusawa, Tokyo, Japan

[73] Assignee: Asahi Kogaku Kogyo Kabushiki Kaisha, Tokyo-to, Japan

[22] Filed: Feb. 8, 1973

[21] Appl. No.: 330,622

[30] Foreign Application Priority Data
Feb. 10, 1972 Japan .............................. 47-013963

[52] U.S. Cl. ................................................. 354/51
[51] Int. Cl. .............................................. G03b 7/08
[58] Field of Search .................................. 95/10 CT

[56] References Cited
UNITED STATES PATENTS 3,633,473   1/1972   Yashuhiro .............................. 95/10
3,651,744   3/1972   Okada ..................................... 95/10

*Primary Examiner*—Samuel S. Matthews
*Assistant Examiner*—Michael L. Gellner
*Attorney, Agent, or Firm*—Steinberg & Blake

[57] ABSTRACT

An electrical system for controlling a camera shutter. The electrical system includes a memory capacitor for storing a voltage and an oscillator connected to the capacitor for transmitting pulses thereto to form the voltage stored thereby. The oscillator is operated in accordance with factors such as brightness at the object to be photographed, film speed, and diaphragm setting, so that the voltage stored by the memory capacitor will correspond to these factors. A circuit which is electrically connected to a camera shutter to determine the duration during which it remains open is electrically connected with the memory capacitor to be controlled thereby.

10 Claims, 5 Drawing Figures

AUTOMATIC CAMERA SHUTTER CONTROLS UTILIZING PHOTOELECTRICALLY CONVERTED PULSES

BACKGROUND OF THE INVENTION

The present invention relates to cameras.

More particularly, the present invention relates to circuits for automatically controlling camera shutters, so as to provide an automatic determination of exposure time. At the present time, various circuits of the above type have been provided and some of them are presently on the market. Cameras which have circuits for automatically determining exposure time are popular because such circuits succeed in eliminating troublesome operating steps which the camera operator would otherwise have to perform in order to determine the exposure time.

However, conventional circuits of this latter type suffer from the drawback of being easily influenced by changes of temperature either in the field of view, which is to say at the object to be photographed, or fluctuations in the ambient temperature where the camera is located, because shutter controls of the above type necessarily include a number of semiconductors. In other words, inasmuch as the characteristics of the shutter operation will change in accordance with temperature fluctuations because of the dependency of semiconductor components on temperature, the desired precision in the adjustment of the exposure time will not be achieved. As a result, it has been proposed to provide for the shutter-controlling circuits compensating circuit components to compensate for the temperature fluctuations. Circuits of this latter type, however, become undesirably complex and the cost of the structure therefore becomes undesirably high. Moreover, shutter-controlling circuits which have temperature-compensating components have not always proved to be as effective as expected. In fact, experience has shown that very few of these temperature-compensating circuits can be considered of high quality from a practical point of view.

In addition, electrical systems of the above type require a battery to serve as the source of energy, and as such batteries become consumed or remain for a considerable time without being used the energy stored thereby decreases, to bring about a change in voltage. This change in voltage will in turn also change the characteristics of operation of the shutter-controlling circuit. In order to alleviate this latter problem it has already been proposed to provide checking circuits for checking the condition of the electrical source of energy. However, while it is possible with such checking circuits to confirm that the electrical source of energy such as a battery has been properly inserted into the circuit and is also suitable for detecting a relatively large decline in the voltage stored by the battery, nevertheless such checking circuits cannot detect ordinary small changes in voltage. However it is precisely such small voltage changes which will produce improper determination of exposure time.

SUMMARY OF THE INVENTION

It is accordingly a primary object of the present invention to provide a shutter-controlling circuit which will avoid the above drawbacks.

In particular, it is an object of the present invention to provide an electrical system for determining operation of a camera shutter in such a way that temperature fluctuations will have no undesirable influence even though temperature compensating circuits are not used.

Also, it is an object of the present invention to provide an electrical system for controlling a camera shutter in such a way that small variations in the voltage stored by a source of energy such as a battery will have no undesirable influence, while at the same time rendering the use of an electrical source checking circuit unnecessary.

It is furthermore an object of the present invention to provide an electrical system for controlling a camera shutter in such a way that effective controls can be achieved even over a relatively wide range of a variable factor such as brightness at the object to be photographed.

According to the invention the electrical system includes a memory means for storing a voltage and an oscillator means electrically connected with the memory means for transmitting pulse voltages thereto in order to form the voltage stored thereby. An actuating means is electrically connected with the oscillator means for operating the latter to transmit pulses to the memory means in accordance with such factors as brightness at the object to be photographed, diaphragm setting and film speed. An exposure-time determining means is electrically connected with the memory means to determine the exposure time in accordance with the voltage stored by the memory means, and a means is electrically connected with this exposure-time determining means for rendering the latter operative in synchronism with opening of the shutter while the exposure-time determining means itself renders operative a means for initiating closing of the shutter when the exposure time determined by the exposure-time determining means has elapsed.

BRIEF DESCRIPTION OF DRAWINGS

The invention is illustrated by way of example in the accompanying drawings which form part of this application and in which.

DESCRIPTION OF PREFERRED EMBODIMENTS

In accordance with the present invention the exposure time regulating information is formed by accumulating the photoelectrically converted pulses and by making the number of pulses produced or accumulated correspond to the change of brightness of the field of view.

Figure 1:
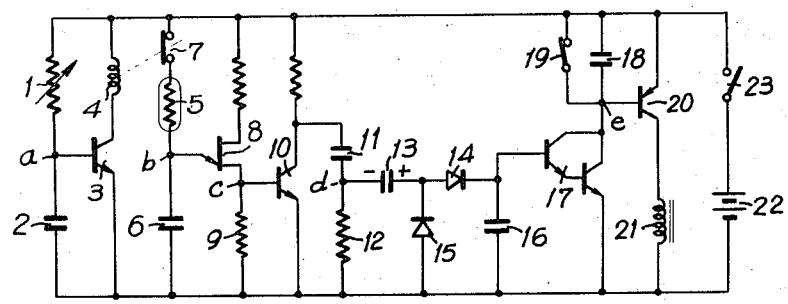
FIG. 1 is a wiring diagram illustrating one possible embodiment of an electrical system according to the invention.

Referring to FIG. 1, the junction *a* is shown at the left of FIG. 1 in the series circuit between the variable resistor 1 and the capacitor 2. The variable resistor 1 is a timing resistor which is set in accordance with the factor of diaphragm setting and/or film speed. The junction *a* is electrically connected to the base of a switching transistor 3 electrically connected at its collector to a relay 4 so that the latter will become energized in accordance with the time determined by the setting of the variable resistor 1. These elements 1–4 form a time-limiting circuit or duration-determining means for determining the duration of operation of an operating means which operates an oscillator means so that the latter will produce pulses at a given frequency for the duration determined by the duration-determining means 1–4. This operating means is in the form of a photoelectrically converting circuit formed by the photoconductor 5 which responds to the light of the object to be photographed and the capacitor 6 which is connected in series with the photoconductor 5. Thus, this photoconductor 5 can be situated along the optical axis behind the objective to respond to light which travels from the object to be photographed through the objective, or the photosensitive means 5 can be situated at the front wall of the camera behind a window, for example, so as to respond to light at the object to be photographed although this light does not travel through the camera objective before reaching the photosensitive means 5. Thus it will be seen that a photosensitive operating means 5, 6 is provided for operating the oscillator means which is formed by the illustrated UJT 8 whose emitter is connected to the junction *b* between the photoconductor 5 and the capacitor 6. In addition it will be noted that the relay 4 includes a relay switch 7 connected in series with the photoconductor 5 so that when the relay 4 becomes energized in response to turning "on" of the switching transistor 3, the switch 7 will be displaced from its normally closed position to an open position in order to terminate the actuation of the oscillator means 8 by the operating means 5, 6. This oscillator means 8 is in the form of a double base diode forming the illustrated UJT whose emitter is connected to the junction *b*, this UJT having inserted into its first base an output resistor 9 so as to form an oscillating circuit of photoelectrically converted pulses.

A switching transistor 10 has its base electrically connected to the junction *c* in the first base of UJT 8, so that the turning of the transistor 10 "on" and "off" is carried out in response to receiving the photoelectrically converted pulses at the base of UJT 8.

A differentiating circuit is formed by the series connected capacitor 11 and resistor 12, this differentiating circuit being connected in parallel with the transistor 10 between the collector and emitter thereof. A capacitor 13 is electrically connected to the junction *d* between the capacitor 11 and the resistor 12, and this capacitor 13 forms an accumulation circuit together with the diodes 14 and 15 and the memory capacitor 16 which forms a memory means for storing a voltage the magnitude of which will be determined in accordance with the factors of brightness at the object to be photographed, film speed, and/or diaphragm setting. The internal resistance of a transistor circuit 17 of high input impedance is determined by the pulse accumulation voltage of the memory capacitor 16. This transistor circuit 17 forms together with the timing capacitor 18 an exposure-time determining means.

The capacitor 18 is connected to the output side of the transistor circuit 17, and the junction *e* is connected with a means for rendering the exposure-time determining means 17, 18 operative, this means for rendering the exposure-time determining means 17, 18 operative including the normally closed switch 19 which is connected to the junction *e* in the manner illustrated and which opens in synchronism with opening of the shutter. Thus in a well known manner when the shutter opens a transmission to the switch 19 also opens the latter so that the switch 19 no longer bypasses the capacitor 18 and the latter becomes operative for coacting with the transistor circuit 17 to determine the exposure time, as explained further below. This release switch 19 thus opens in synchronism with the opening of the shutter.

A means is electrically connected with the exposure-time determining means 17, 18 in order to initiate a shutter-closing operation upon elapse of a time determined by the exposure-time determining means 17, 18. This means for initiating the shutter-closing operation includes the switching transistor 20 which becomes conductive after elapse of the exposure time determined by the means 17, 18. Thus, the base of the transistor 20 is electrically connected also to the junction *e*, and the collector of the transistor 20 is connected to an electromagnet 21 which upon becoming energized, when transistor 20 turns "on," causes the shutter closing operation to be carried out. In other words the electromagnet 21 may attract a pawl to move the latter to a release position which releases the shutter so that it can assume its closed position.

The electrical system of FIG. 1 is completed by the electrical source of energy formed by the battery 22 and by the switch 23 which is closed during the initial part of the depression of a shutter-operating plunger of the camera in order to render the entire circuit of FIG. 1 operative.

Thus, with the above-described embodiment of FIG. 1 the closing of the switch 23 during the initial part of the depression of the shutter-tripping plunger, before the shutter actually opens, will result in energizing of the time-limiting circuit 1–4, the photoelectric converting circuit 5, 6, and the differentiating circuit 11, 12. The electric potential at the junction *b* therefore rises according to the brightness at the object to be photographed, as sensed by the photosensitive means 5. When the potential at junction *b* rises sufficiently the trigger voltage of UJT 8 will be reached and UJT 8 thus carries out the first oscillation to raise rapidly the electric potential at the junction *c* of its first base, temporarily. As a result the transistor 10 becomes conductive and the capacitor 11 of the differentiating circuit which has already been charged, with the closing of the switch 23, discharges at this time. This capacitor 11 discharges through the transistor 10 and the resistor 12. At the same time the capacitor 13 is charged to a predetermined extent by changing the anode side of diode 15 to the positive electric potential direction and the junction *d* side to the negative electric potential direction. Thus, at this time the polarity of the charge to capacitor 13 is as illustrated in FIG. 1.

On the other hand, the capacitor 6 of the photoelectrically converting circuit which forms the operating means for the oscillator means 8 discharges due to oscillation of UJT 8 and the electric potential at the emitter of UJT 8 drops so that UJT 8 temporarily stops operating after carrying out an oscillation. As a result the transistor 10 which initially was "on" is again rendered non-conductive and returns to its "off" condition so that capacitor 11 of the differentiating circuit 11, 12 again is charged from the source 22. At this time as the junction d rises to the positive electric potential direction based on the voltage drop at resistor 12 in the differentiating circuit, the electric charge at capacitor 13 with the polarity illustrated in FIG. 1 is applied to the memory capacitor 16 through the diode 14. Thus, one photoelectrically converted pulse is accumulated at the memory capacitor 16, and a series of such photoelectrically converted pulses accumulate one after the other with repetition of the above operations.

With the particular embodiment which is shown in FIG. 1, the frequency of the photoelectrically converted pulses, or in other words the frequency of oscillation of the oscillator means 8, is determined by the brightness of the field of view since the oscillator means 8 is operated by the photosensitive means 5, 6 which includes the photoconductor 5 which responds to the brightness at the object to be photographed. On the other hand, the duration of the oscillations is determined by the duration-determining means 1–4 which forms the time-limiting circuit. This duration-determining means 1–4 starts operating upon closing of the switch 23 and after a predetermined duration has elapsed, irrespective of brightness at the object to be photographed, the relay 4 will become energized in accordance with the setting of the variable resistor 1. This variable resistor 1 is set in accordance with the speed of the film which is to be exposed in the camera and in accordance with the selected diaphragm setting. Thus, after elapse of a time determined by the duration-determining means 1–4, and in accordance with the setting of the variable resistor 1, the relay 4 will become energized to open the normally closed switch 7 and thus terminate the operation of the oscillator-operating means 5, 6. Thus, the pulse voltage accumulated at the memory capacitor 16, which forms the memory means, at the moment of opening of the switch 7 will determine the final bias voltage of the transistor circuit 17, determining the internal resistance of the latter.

All of the above operations are carried out during the initial part of the movement of the shutter-operating plunger by the operator, prior to actual tripping of the shutter. When the shutter-tripping plunger has been moved by the operator sufficiently to trip the shutter, the shutter automatically opens in a well known manner and through an unillustrated transmission the synchronous switch 19 opens at the same instant that the shutter opens. Thus, the switch 19 forms the means for rendering the exposure-time determining means 17, 18 operative. Thus, the regulating electrical current which previously was flowing through the release switch 19 and the transistor circuit is added to the capacitor 18 so that the electric potential at the junction e gradually declines. Inasmuch as this latter electrical potential corresponds to the magnitude of the internal resistance of transistor circuit 17, which is to say the pulse storage voltage of memory means 16, the exposure time will be determined in accordance with the voltage stored by the memeory capacitor 16. When the electrical potential at the junction e declines to a given value, the switching transistor 20 is rendered conductive, or in other words turns "on," and thus the electromagnet 21 is energized so as to initiate the shutter-closing operation. Thus, components 20 and 21 form a means for initiating a shutter-closing operation when an exposure time has elapsed as determined by the instant when switch 19 opens in synchronism with opening of the shutter and the exposure time duration determined by circuit 17 and capacitor 18, as described above.

Thus, the shutter closes and exposure is completed.

Figure 2:
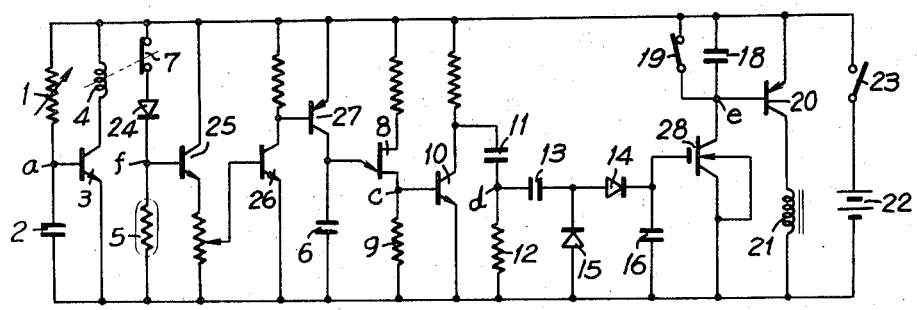
FIG. 2 is wiring diagram of another embodiment of an electrical system according to the present invention.

According to the embodiment of the invention which is illustrated in FIG. 2, the pulse storage voltage stored at the memory means 16 is logarithmically compressed and converted so that it has a characteristic which enables the initial relatively large geometric progression of the information received by the system to be compressed into an arithmetic progression. As a result it becomes possible with the system of FIG. 2 to operate the shutter accurately even when there is a relatively wide range of brightness at the object to be photographed, so that the possible range of brightness with which the system is operative can be enlarged. Considering the embodiment of FIG. 1, the pulse storage voltage of capacitor 16, which stores the photoelectrically converted pulses, changes greatly according to a geometric progression so that the range of variation of the voltage in the capacitor 16 also becomes large when the variation range of light intensity at the object to be photographed is relatively large. In other words in order to be capable of operating under lighting conditions which range from relatively little light to relatively bright light, it is necessary for the capacitor 16 to be capable of storing voltage over a large range. As a result for practical reasons the shutter operation is possible only with respect to a relatively small variation range of the light intensity at the object to be photographed. For example, assuming that the shutter speed can vary from 1 millisecond to 1 second, then a voltage ratio of 1:1,000 is required. If the minimum pulse storage voltage is 1 mV, then the maximum must be 1V, and if the minimum is 10 mV, then the maximum must be 10V. Thus, the voltage value which becomes the maximum stored value will become quite high so that electrical shutter controls may not be practical if constructed according to FIG. 1 to be used over such a wide range. However, with the embodiment of FIG. 2 the pulse storage voltage is stored at the memory capacitor 16 in a manner according to which it is converted so that it has an arithmetic progression in order to enlarge the range of light intensity which can be handled by the system.

Referring now to FIG. 2, it will be seen that a logarithmic compression means is included in this embodiment, this logarithmic compression means being formed by the diode 24 which is connected in series with the photoconductor 5. Thus, with this embodiment at the junction f the signal or photoelectrically converted information will appear changed to an arithmetic progression, and the resistance characteristic of the amplifying transistor 27 can be changed through transistors 25 and 26 to bring about the switching action. As a result, the oscillating frequency of the oscillator means formed UJT 8 is determined by the internal resistance value of the transistor 27 and the time constant determined by the capacitor 6. Therefore, with this circuitry while the brightness of the object to be photographed changes according to a geometric progression, the frequency of oscillation at the oscillator means 8 changes according to an arithmetic progression. Therefore the pulse storage voltage stored at the memory capacitor 16 will have a characteristic which changes according to an arithmetic progression.

With the embodiment of FIG. 2 there is an electrical field effect transistor or FET 28 which replaces the transistor circuit 17 of FIG. 1, and this FET 28 changes its internal resistance in response to the voltage stored at the memory capacitor 16. As is well known, the internal resistance changing characteristic of FET 28 changes in accordance with a geometric progression with respect to the same interval bias. Therefore it is possible for the FET 28 to restore the storage voltage of memory capacitor 16 from the arithmetic progression into a characteristic which changes according to a geometric progression. Therefore, FET 28 acts also as a logarithmic expansion circuit. Thus, the photoelectrically converted pulse is stored at memory capacitor 16 according to an atithmetic progression, and the stored voltage is expanded at the time of shutter release back to a characteristic conforming to the geometric progression so as to enable the closing of the shutter to be properly determined. All of the remaining components of FIG. 2 correspond to those of FIG. 1, operate in the same way, and are designated by the same reference characters.

In both of the above embodiments of the invention the oscillator means formed by UJT 8 is actuated by an actuating means which includes the operating means formed by the photoelectric converting circuit 5, 6 and the duration-determining means formed by components 1–4, as described above. Thus, the actuating means will determine the frequency of operation of the oscillator means and the duration of operation thereof according to factors of brightness at the object to be photographed, film speed, and diaphragm setting. However, instead of using a photosensitive operating means it is possible to provide an actuating means in which the duration-determining means is photosensitive and the operating means for operating the oscillator is capable of being adjusted according to one of the factors of diaphragm setting or film speed. The advantage of such a variation in the structure resides in the fact that the range of oscillation frequency of UJT 8 can be limited to the variation range of exposure factors such as film speed and diaphragm setting. In this way it is possible to operate UJT 8 within a narrower range of oscillation frequency and a more effective operation of the oscillator means can be achieved. Where the frequency is determined by a photosensitive operating means, as in FIGS. 1 and 2, the oscillating range must be relatively large.

Figure 1A:
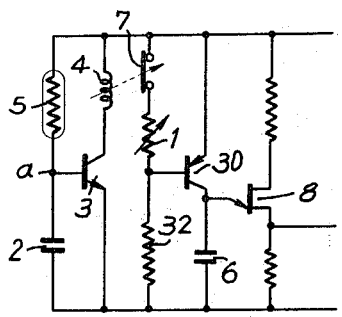
FIG. 1A is a fragmentary wiring diagram showing another embodiment of the left part of the circuit of FIG. 1.
Figure 2A:
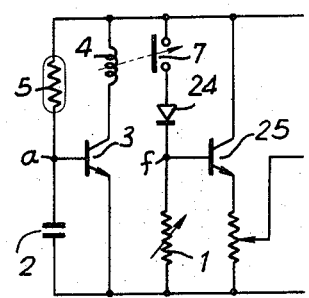
FIG. 2A is a fragmentary wiring diagram showing another embodiment of the left part of the wiring diagram of FIG. 2.

Referring to FIGS. 1A and 2A, it will be seen that the circuits illustrated therein conform to this variation according to which the duration-determining means is photosensitive while the operating means which determines the frequency of UJT 8 is set according to the factor of film speed and/or diaphragm setting. Thus, referring to FIG. 1A, it will be seen that the operating means for UJT 8 includes the variable resistor 1 which in this case is connected to the capacitor 6 through the illustrated transistor 30 whose base is connected to a junction between the variable resistor 1 and an additional resistor 32. Thus, the oscillating frequency of UJT 8 will be determined in this case by the setting of the variable resistor 1, in accordance with film speed and/or diaphragm setting, so that the range of oscillating frequency of UJT 8 can be fairly limited inasmuch as the range of adjustment for the latter factors is much smaller than that required for brightness at the object to be photographed. On the other hand, the duration-determining means, which forms the time-limiting circuit limiting the duration of operation of UJT 8, includes the photoconductor 5 connected in series with the capacitor 2 by way of the junction $a$ which is connected to the base of the switching transistor 3 which is electrically connected with the relay 4 as described above. Thus, in accordance with the brightness at the object to be photographed the relay 4 will become energized when the transistor 3 becomes conductive, and the normally closed switch 7 of the relay will opened to terminate the operation of the oscillator means by the operating means of FIG. 1A which includes the variable resistor 1. Therefore, with the embodiment of FIG. 1A the duration of operation of the oscillator means will be determined in accordance with the brightness at the object to be photographed while the frequency of the pulse voltages will be determined in accordance with the diaphragm setting and/or film speed, so that in this way the range of frequency of the pulse voltages can be much more limited than is the case with the embodiments of FIGS. 1 and 2.

In the same way, in FIG. 2A, the structure is the same as FIG. 2 except that the actuating means for actuating the oscillator means 8 includes in this case an operating means which includes the variable resistor 1 which is connected in series with the logarithmic compression diode 24 by way of the junction $f$ connected to the base of the transistor 25 in the same way as in FIG. 2. The duration-determining means of the actuating means of FIG. 2A includes the photoconductor 5 connected in series with the capacitor 2 by way of the junction $a$ which is connected to the base of the transistor 3 which is connected to the relay 4 in the same way as described above in connection with FIG. 2. Thus, with this embodiment also while the advantage of logarithmic compression is maintained, as described above in connection with FIG. 2, there is the added advantage of limiting the range of frequency of the oscillator means by utilizing the operating means which includes the variable resistor 1 which is set according to the selected diaphragm setting and according to the speed of the film which is exposed, while the duration of operation of the oscillator means is determined in this case by the brightness at the object to be photographed, the time limiting circuit being photosensitive inasmuch as it includes the photoconductor 5 which will operate to determine the duration of operation of the oscillator means in accordance with the brightness at the object to be photographed.

Moreover, while with the embodiments described above the oscillator means is illustrated as taking the form of UJT 8 which is utilized to generate the photoelectrically converted pulses, it is possible to use other oscillator means such as a self-running multivibrator circuit or an RC phase-shifting oscillation circuit, either of which may also be used to achieve the photoelectrically converted pulses by suitable electrical connection to the photoelectric conversion element such as the photoconductor 5.

Figure 3:
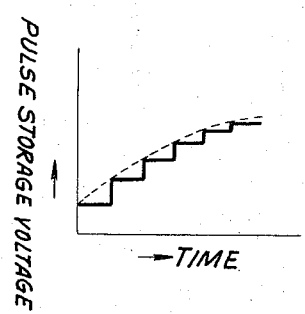
FIG. 3 is a graph illustrating the manner in which voltage accumulates at a memory means of the electrical system of the invention.

With the embodiments described above the pulse storage voltage stored by the memory means 16 is in the form of an accumulation of a plurality of pulses. Thus, the stored voltage is not a linear voltage but is rather a non-linear voltage as illustrated in FIG. 3. In order to make the stored voltage linear a compensation circuit may be utilized. In this latter event the simplest expedient is to make the capacitance of the memory means 16 large enough, as compared with the capacitance of capacitor 13 of the pulse storage circuit, or it is also possible to achieve the same result by making the amplitude of the photoelectrically converted pulse relatively large. In addition, it is possible to add a further circuit which adds a positive feedback voltage to the memory capacitor 16. Thus, compensation may be carried out to make the storage voltage of memory capacitor 16 linear by providing a bootstrap circuit or a Miller circuit, both of which are widely known as expedients to achieve positive feedback to a capacitor. In other words, the voltage stored at the memory capacitor 16 becomes non-linear because of the existance of the residual voltage charged preliminarily to the memory capacitor 16, and therefore any expedient for removing this residual voltage will achieve the desired result.

As described above, in accordance with the present invention the stored pulse voltage is formed by accumulating the photoelectrically converted pulses in response to the brightness at the object to be photographed, so as to use the stored voltage as an information signal for determining the exposure time and controlling the operation of the shutter. It is possible in this way to reduce the dependency on temperature as well as the influence of a change of the electric source voltage to a remarkable extent as compared with conventional expedients for controlling the shutter operation by waY of direct current, converted information of the light intensity at the object to be photographed. In addition, it becomes possible to enlarge the range of light intensity with which it is possible to make proper photographs by compressing the pulse storage voltage which is utilized as the controlling or regulating signal so as to provide this latter controlling factor in the form of an arithmetic progression. Furthermore, in accordance with the present invention there is no necessity of providing a temperature compensating circuit and the circuit construction is simplified. Thus, it becomes possible to provide with the present invention an electrical system for controlling a camera shutter in a highly practical manner which is of great utility.

What is claimed is:

1. In an electrical system for operating a camera shutter, memory means for storing a voltage, oscillator means electrically connected with said memory means for transmitting pulse voltages thereto, said memory means cumulatively storing said pulse voltages, actuating means electrically connected with said oscillator means for actuating the latter to transmit to said memory means pulse voltages in accordance with factors such as brightness at the object to be photographed, diaphragm setting, and film speed, exposure-time determining means electrically connected directly with said memory means for responding to the voltage stored thereby to determine exposure time, means electrically connected with said exposure-time determining means for rendering the latter operative in synchronism with opening of a camera shutter, and means electrically connected with said exposure-time determining means for initiating a shutter-closing operation when the exposure time determined by said exposure-time determining means has elapsed.

2. The combination of claim 1 and wherein said exposure-time determining means includes a transistor circuit of high input impedance while said memory means includes a capacitor for storing said voltage and connected electrically to said transistor circuit of high impedance for determining the internal resistance thereof.

3. In an electrical system for operating a camera shutter, memory means for storing a voltage, oscillator means electrically connected with said memory means for transmitting pulse voltages thereto to form the voltage stored by said memory means, actuating means electrically connected with said oscillator means for actuating the latter to transmit to said memory means pulse voltages in accordance with factors such as brightness at the object to be photographed, diaphragm setting, and film speed, exposure-time determining means electrically connected directly with said memory means for responding to the voltage stored thereby to determine exposure time, means electrically connected with said exposure-time determining means for rendering the latter operative in synchronism with opening of a camera shutter, and means electrically connected with said exposure-time determining means for initiating a shutter-closing operation when the exposure time determined by said exposure-time determining means has elapsed, said actuating means including an operating means electrically connected with said oscillator means for operating the latter to provide said pulse voltages at a given frequency and said actuating means including a duration-determining means electrically connected with said operating means for determining the duration of operation of said operating means, said operating means determining the frequency of said pulse voltages in accordance with one of said factors and said duration-determining means determining the duration of operation of said operating means in accordance with at least another one of said factors.

4. The combination of claim 3 and wherein said operating means is a photosensitive means for determining the frequency of the pulse voltages in accordance with the brightness at the object to be photographed while said duration-determining means determines the duration of operation of said operating means in accordance with at least one of the factors of diaphragm setting and/or film speed.

5. The combination of claim 3 and wherein said duration-determining means is a photosensitive means for determining the duration of operation of said operating means in accordance with brightness of the object to be photographed while said operating means determines the frequency of said pulse voltages in accordance with at least one of the factors of diaphragm setting and/or film speed.

6. The combination of claim 3 and wherein said oscillator means includes a UJT.

7. The combination of claim 2 and wherein a logarithmic compression means is electrically connected with said actuating means for compressing the information according to which said actuating means actuates said oscillator means from a geometric progression to an arithmetic progression, said exposure-time determining means including an FET with which is electrically connected with said memory means to be operated thereby and which logarithmically expands the logarithmically compressed information back to the form of a geometric progression.

8. The combination of claim 7 and wherein said logarithmic compression means including a diode connected in series with said operating means.

9. The combination of claim 8 and wherein said operating means is photosensitive for operating said oscillator means according to the factor of brightness at the object to be photographed, and said operating means being in the form of a photoconductor connected in series with said diode.

10. The combination of claim 8 and wherein said operating means includes a variable resistor for operating said oscillator means at a frequency determined by the adjustment of said variable resistor, the latter being adjusted in accordance with at least one of the factors of film speed and/or diaphragm setting, and said diode being connected in series with said variable resistor.

* * * * *